(12) United States Patent
Gratton et al.

(10) Patent No.: US 7,578,452 B2
(45) Date of Patent: Aug. 25, 2009

(54) ABLATIVE COMPOSITE ASSEMBLIES AND JOINING METHODS THEREOF

(75) Inventors: Jason Gratton, Chandler, AZ (US); Don Christensen, Phoenix, AZ (US); John Perek, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1338 days.

(21) Appl. No.: 10/650,166

(22) Filed: Aug. 27, 2003

(65) Prior Publication Data

US 2005/0044709 A1   Mar. 3, 2005

(51) Int. Cl.
B64D 33/04 (2006.01)
F02G 1/00 (2006.01)

(52) U.S. Cl. .................. 239/265.15; 60/200.1

(58) Field of Classification Search .................... 156/66; 102/374, 377; 244/159.1; 60/200.1; 239/265.15
See application file for complete search history.

(56) References Cited

U.S. PATENT DOCUMENTS

| | | | | |
|---|---|---|---|---|
| 3,418,707 A | * | 12/1968 | Herff | 29/890.01 |
| 3,595,025 A | * | 7/1971 | Stockel et al. | 60/267 |
| 3,830,666 A | * | 8/1974 | Schneider | 156/86 |
| 4,084,781 A | | 4/1978 | Couch et al. | |
| 4,539,244 A | * | 9/1985 | Beggs et al. | 428/116 |
| 4,595,714 A | | 6/1986 | McAllister et al. | |
| 4,652,476 A | * | 3/1987 | Kromrey | 428/34.1 |
| 4,656,095 A | | 4/1987 | McAllister et al. | |
| 4,805,402 A | | 2/1989 | Power et al. | |
| 5,264,059 A | | 11/1993 | Jacaruso et al. | |
| 5,906,707 A | | 5/1999 | McCall | |
| 6,042,671 A | | 3/2000 | Park et al. | |
| 6,308,408 B1 | | 10/2001 | Myers et al. | |
| 6,951,317 B2 | * | 10/2005 | Woessner et al. | 244/3.22 |

* cited by examiner

Primary Examiner—Michael Cuff
Assistant Examiner—Gerald L Sung
(74) Attorney, Agent, or Firm—Ingrassia Fisher & Lorenz, P.C.

(57) ABSTRACT

A cured ablative composite assembly comprises a housing enclosing a pair of ablative composite sub-assemblies joined by a film adhesive. The cured ablative composite assembly is made by surface treating both ablative composite sub-assemblies in preparation for joining; coupling one ablative composite sub-assembly to another ablative composite sub-assembly with a film adhesive and enclosing the uncured ablative composite assembly within a housing; and depositing the combination of the housing and uncured ablative composite assembly in a ventilated oven with a load applied to the combination housing and uncured ablative composite assembly. The film adhesive is cured providing a portion of a hot gas valve suitable for use in tactical missiles. The film adhesive does not erode at the high temperatures (5000° F.) encountered in hot gas rocket exhausts, thereby providing a seal that offers high strength, pressure-tight joints.

20 Claims, 6 Drawing Sheets

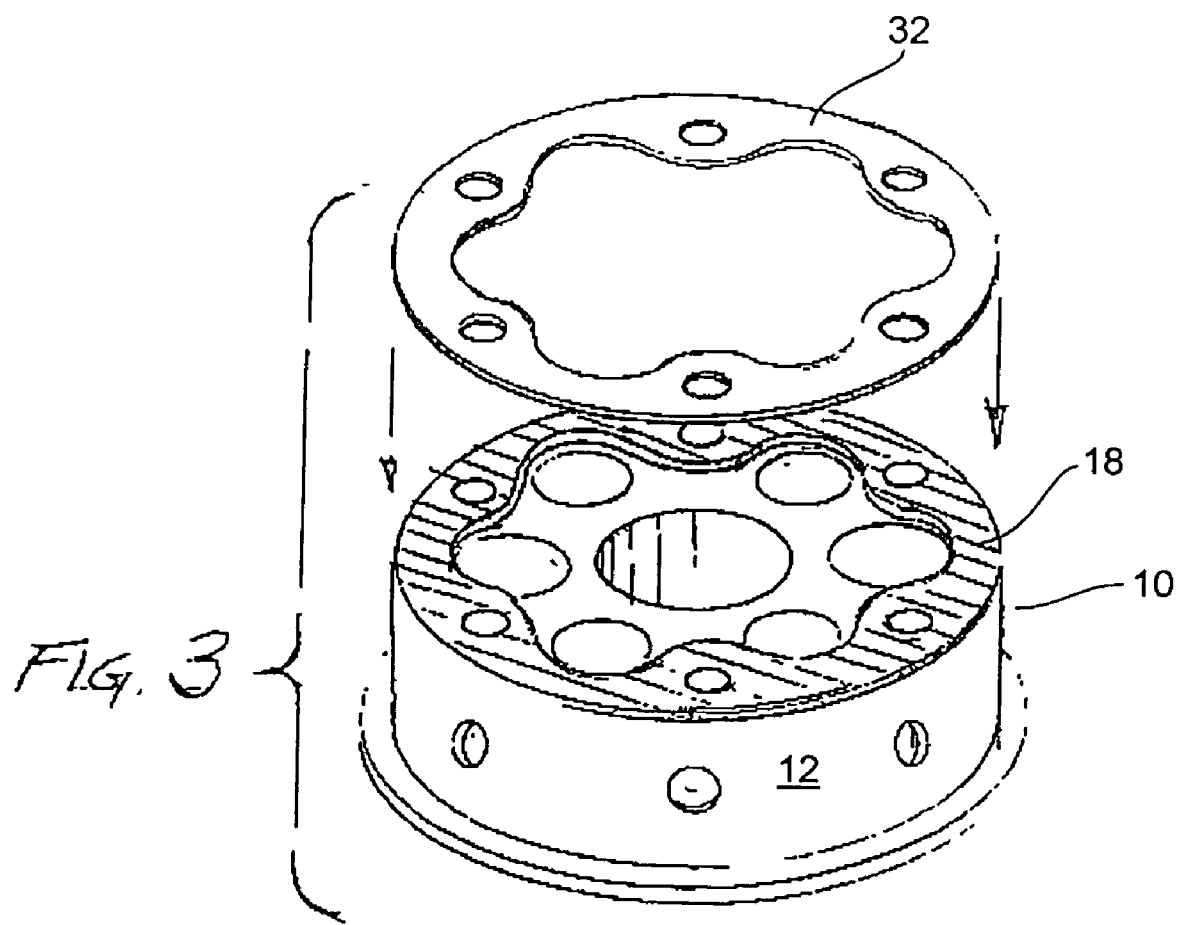

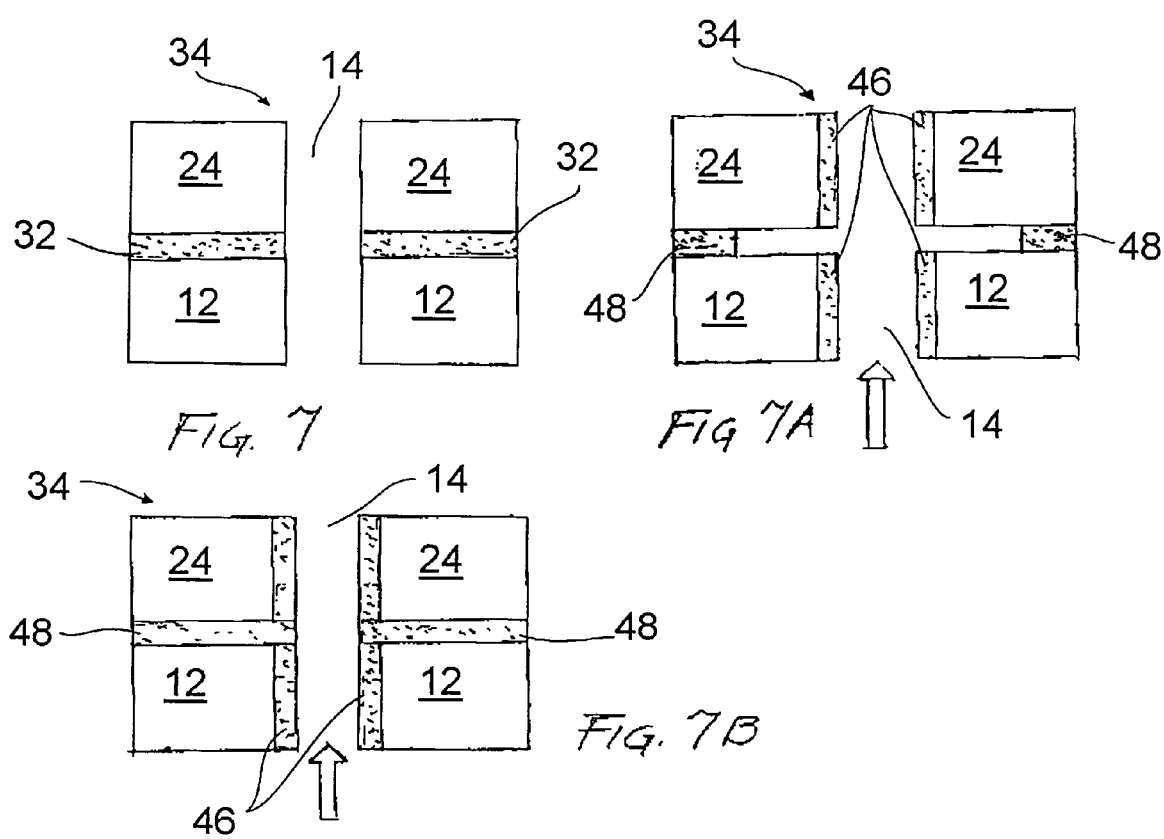

ABLATIVE COMPOSITE ASSEMBLIES AND JOINING METHODS THEREOF

STATEMENT REGARDING FEDERALLY SPONSORED RESEARCH OR DEVELOPMENT

This invention was made Government support under Agreement No. F0863099C0027 awarded by the Air Force Research Laboratory. The Government may have certain rights in this invention.

BACKGROUND OF THE INVENTION

1. Field of the Invention

This invention relates generally to composite materials and joining methods, and more specifically to ablative composite assemblies and improved joining methods thereof.

2. Description of the Related Art

Current practice necessitates joining different ablative materials for use in high temperature applications. Typically applications where this was necessary occurred in the aerospace industry for missiles or in capsules returning from space. The ablative material was typically a sacrificial layer that protected other portions of a vehicle from catastrophic damage. If the adhesive layer joining the ablative material to other portions of the vehicle deteriorated more rapidly than the ablative material, failure of a portion of the vehicle structure was likely to occur, and often resulted in destructive failure of the entire vehicle.

Currently, ablative materials are joined with various adhesives. Ablative materials are typically cross-linked phenolic resins that may have a number of different fillers. Phenolic resins also vary in terms of polymeric type. Silica fibers that are impregnated with phenolic resins are the basis for making silica phenolic composite assemblies. The properties of silica phenolic composite assemblies depend on a number of factors including cure cycle for the phenolic resin and void content. These variables, amongst others, determine some of the choices that need to be made regarding an appropriate adhesive for joining an ablative composite to another ablative composite or to a substrate that needs to be protected.

Often, for the case of ablative composite assemblies, an adhesive is chosen based on the adhesive's ability to resist a thermal use profile. The choice of adhesive may also depend on convenience factors such as ease of use; need to mix up different ingredients of the adhesive; working time and temperature; curing process for the adhesive; ability to reposition parts of an assembly and maintenance of a desired bond line thickness. Paste adhesives are often used in applications because of some of these factors. In the case of paste adhesives, parts that are to be joined must be coated with the adhesive, assembled and loaded, disassembled for cleaning of extruded adhesive and then reassembled. This assemble-disassemble-clean-reassemble process often introduces air gaps that can weaken the bond joint.

Pneumatic valves for missile applications should be lightweight yet capable of withstanding the environment and effects of hot gasses produced from the missile's engine, which may be a solid rocket motor, which is also known as a gas generator. A gas generator can generate a gas at temperatures exceeding five thousand degrees Fahrenheit (5000° F.). Some valves need not necessarily be capable of withstanding these temperature environments for long periods of time, as the valves may only be required to handle hot gas for short duty cycles.

It has been discovered that hot gas valves, such as exhaust valves, used in applications such as for tactical missiles may use inexpensive lightweight ablative composites for their construction. Often, several pieces of ablative composite sub-assemblies used in such applications must be joined together to create a single pressure-tight assembly. Epoxy and RTV (usually Silicone based Room Temperature Vulcanizing) paste adhesives which have been used for joining ablative composite sub-assemblies in these applications have the disadvantage that they are prone to degrade at extremely high temperatures (greater than 5000° F.) encountered in hot gas rocket exhausts. This degradation usually results in loss of a pressure-tight seal between sub-assemblies that have been joined using paste adhesives.

For the foregoing reasons, it is desirable to provide ablative composite assemblies and improved joining methods thereof.

SUMMARY OF THE INVENTION

The inventors of this application have unexpectedly discovered film adhesives for joining ablative composite sub-assemblies for use in hot gas applications that offer high strength, and pressure-tight joints that do not degrade at extremely high temperatures (5000° F.). In addition, the use of film adhesives has eliminated unpredictable bond line coverage and the need for assemble-disassemble-clean-reassemble processes that were necessary with paste adhesives, and also provides bond line thickness control. The method of joining ablative composite sub-assemblies is also adaptable for large scale manufacturing.

An ablative composite assembly is disclosed. In one embodiment, an ablative composite assembly comprises, in combination a first ablative composite sub-assembly and a second ablative composite sub-assembly; and a film adhesive coupled to both the first ablative composite sub-assembly and the second ablative composite sub-assembly, the film adhesive joining the first ablative composite sub-assembly to the second ablative composite sub-assembly to provide the ablative composite assembly when the film adhesive is cured. A portion of a surface of the film adhesive is coupled to an end portion of the first ablative composite sub-assembly and a portion of an opposite surface of the film adhesive is coupled to an end portion of the second ablative composite sub-assembly. The ablative composite assembly further comprises a housing enclosing the first and second ablative composite sub-assembly.

The first ablative composite sub-assembly includes a first substantially cylindrical member, which has an elevated end portion, and a portion of a surface of the film adhesive is coupled to a portion of a surface of the elevated end portion. The second ablative composite sub-assembly includes a second substantially cylindrical member and a portion of a surface of an end portion of the second cylindrical member is coupled to an opposite surface of the film adhesive. A substantially cylindrical protrusion is located at an opposite end of the second cylindrical member.

The film adhesive acts as a sealant and is comprised of a nitrile phenolic compound. The thickness of the film adhesive is about 9-11 mils (0.2-0.3 mm). The film adhesive is unsupported and is selected from the group consisting of SCOTCH-WELD™ AF-31 and PLASTILOCK® 655-1. Preferably the film adhesive is SCOTCH-WELD™ AF-31. The film adhesive is cured at a temperature of substantially 300° F. (149° C.) for at least about 2 hours with a bond line pressure of substantially 25 pounds per square inch (172 KPa). Preferably, the film adhesive is cured at a temperature of substantially 300° F. (149° C.) for about 3 hours with a bond line pressure of substantially 25 pounds per square inch (172 KPa). The ablative composite assembly is made of at least silica phenolic.

In a second embodiment a portion of an ablative composite gas valve is further disclosed. The ablative composite gas valve comprises a first ablative composite sub-assembly and a second ablative composite sub-assembly and a housing, which substantially encloses the first and second ablative composite sub-assembly, as well as a film adhesive, which is coupled to both the first ablative composite sub-assembly and the second ablative composite sub-assembly. The film adhesive joins the first ablative composite sub-assembly to the second ablative composite sub-assembly to provide the ablative composite gas valve when the film adhesive is cured. A portion of a surface of the film adhesive is coupled to an end portion of the first ablative composite sub-assembly and a portion of an opposite surface of the film adhesive is coupled to an end portion of the second ablative composite sub-assembly.

The first ablative composite sub-assembly includes a first substantially cylindrical member and has an enlarged opening for hot gas flow through the first cylindrical member, as well as, a plurality of openings through the first cylindrical member. The first substantially cylindrical member has an elevated end portion and a portion of a surface of the elevated end portion has a multiplicity of openings. A portion of a surface of the film adhesive is coupled to a portion of a surface of the elevated end portion. The first cylindrical member further includes a vertical wall and a portion of a surface of the wall has a multiplicity of radial openings.

The second ablative composite sub-assembly includes a second substantially cylindrical member. The second cylindrical member has an enlarged opening for hot gas flow through the second cylindrical member and the second cylindrical member has a plurality of openings located through the second cylindrical member. The enlarged opening and the openings of the first cylindrical member and the openings located on a portion of the surface of the elevated end portion of the first cylindrical member are in alignment with the enlarged opening and the openings of the second cylindrical member when the first ablative composite sub-assembly is coupled to the second ablative composite sub-assembly. The second ablative composite sub-assembly further comprises a substantially cylindrical protrusion at an opposite end of the second cylindrical member. The cylindrical protrusion has an enlarged opening for hot gas flow through the second cylindrical member.

More particularly in a third embodiment a hot gas valve sub-combination assembly is disclosed. The sub-combination assembly comprises a first substantially silica phenolic ablative composite sub-assembly and a second substantially silica phenolic ablative composite sub-assembly.

The first ablative composite sub-assembly includes a first substantially cylindrical member and the first cylindrical member has an enlarged opening for hot gas flow through the first cylindrical member and a plurality of openings through the first cylindrical member. The first substantially cylindrical member has an elevated end portion, and a portion of a surface of the elevated end portion has a multiplicity of openings. A portion of a surface of a wall of the first cylindrical member has a multiplicity of radial openings.

The second ablative composite sub-assembly includes a second substantially cylindrical member and the second cylindrical member has an enlarged opening for hot gas flow through the second cylindrical member, as well as a plurality of openings through the second cylindrical member. A substantially cylindrical protrusion is located at an opposite end of the second cylindrical member. The cylindrical protrusion has an enlarged opening for hot gas flow through the second cylindrical member. The enlarged opening, the openings of the first cylindrical member and the openings located on a portion of the surface of the elevated end portion are in alignment with the enlarged opening and the openings of the second cylindrical member when the first ablative composite sub-assembly is coupled to the second ablative composite sub-assembly.

A portion of a surface of a thermosetting unsupported nitrile phenolic film adhesive is coupled to a portion of the surface of the elevated end portion and a portion of an opposite surface of the film adhesive is coupled to a portion of a surface of an end portion of the second ablative composite sub-assembly. A steel housing substantially encloses the first and second ablative composite sub-assembly and the film adhesive providing a portion of a hot gas valve when the film adhesive is cured.

In a fourth embodiment, a method for making an ablative composite hot gas valve is disclosed. A first ablative composite sub-assembly and a second ablative composite sub-assembly are provided; a housing which substantially encloses the first and second ablative composite sub-assembly is provided; and a film adhesive coupled to both the first ablative composite sub-assembly and the second ablative composite sub-assembly to provide the ablative composite hot gas valve when the film adhesive is cured is provided. A portion of a surface of the film adhesive is coupled to an end portion of the first ablative composite sub-assembly and a portion of an opposite surface of the film adhesive is coupled to an end portion of the second ablative composite sub-assembly.

The first ablative composite sub-assembly, which is provided includes a first substantially cylindrical member, in which the first cylindrical member has an enlarged opening for hot gas flow through the first cylindrical member and a plurality of openings through the first cylindrical member and the first substantially cylindrical member has an elevated end portion, a portion of a surface of the elevated end portion also has a multiplicity of openings; and a portion of a surface of the film adhesive is coupled to a portion of a surface of the elevated end portion of the first cylindrical member; the first cylindrical member, which is provided further includes a vertical wall, in which a portion of a surface of the wall has a multiplicity of radial openings; the second ablative composite sub-assembly, which is provided includes a second substantially cylindrical member and the second cylindrical member has an enlarged opening for hot gas flow through the second cylindrical member; the second cylindrical member has a plurality of openings located through the second cylindrical member; and the enlarged opening and the openings of the first cylindrical member and the openings located on a portion of the surface of the elevated end portion of the first cylindrical member are in alignment with the enlarged opening and the openings of the second cylindrical member when the first ablative composite sub-assembly is coupled to the second ablative composite sub-assembly; and the second ablative composite sub-assembly, which is provided further comprises a substantially cylindrical protrusion at an opposite end of the second cylindrical member, in which the cylindrical protrusion has an enlarged opening for hot gas flow through the second cylindrical member.

The film adhesive is cut to a shape corresponding to the shape of a portion of the surface of the elevated end portion of the first cylindrical member; a portion of a surface of an end portion of the first cylindrical member is masked off to protect the surface of the end portion; a portion of the surface of the elevated end portion is abraded; a portion of the surface of an end portion of the second cylindrical member is abraded; a portion of the abraded surface of the elevated end portion and a portion of the abraded surface of the end portion of the second cylindrical member is cleaned with a solvent; and the solvent is blow dried off in preparation for coupling the film adhesive to a portion of the surface of the elevated end portion and to a portion of the surface of the end portion of the second cylindrical member.

A backing is removed from a surface of the film adhesive; a portion of a surface of the film adhesive is coupled to a portion of the surface of the elevated end portion; the film adhesive is tacked; another backing is removed from an opposite surface of the film adhesive while eliminating voids; and a portion of the surface of the end portion of the second cylindrical member is coupled to the opposite surface of the film adhesive in preparation for curing.

The first ablative composite sub-assembly and second ablative composite sub-assembly are aligned; guide pins are inserted through openings of the first cylindrical member and second cylindrical member; a housing is mounted to substantially enclose the combination of the first ablative composite sub-assembly coupled to the second ablative composite sub-assembly; the housing and the combination of the first ablative composite assembly coupled to the second ablative composite sub-assembly are loaded into a ventilated oven; and the film adhesive is cured to provide the ablative composite hot gas valve.

The foregoing and other objects, features, and advantages of the invention will be apparent from the following, more particular, description and drawings of the preferred embodiments of the invention.

BRIEF DESCRIPTION OF THE DRAWINGS

FIG. 3 is a perspective view of a film adhesive positioned for coupling to a portion of an elevated surface of the first ablative composite sub-assembly of FIG. 1;

FIG. 7 is an illustration of the appearance of the cured ablative composite assembly prior to hot surface gasses passing through the cured ablative composite assembly;

FIG. 7A is an illustration of the appearance of the cured ablative composite assembly after hot surface gasses pass through the cured ablative composite assembly using a paste adhesive to join together the ablative composite sub-assemblies; and FIG. 7B is an illustration of the appearance of the cured ablative composite assembly after hot surface gasses pass through the cured ablative composite assembly using a film adhesive to join together the ablative composite sub-assemblies according to this invention.

DESCRIPTION OF THE PREFERRED EMBODIMENT(S)

Reference will now be made in detail to exemplary embodiments of the invention, examples of which are illustrated in the accompanying drawings. Wherever possible, the same reference numbers will be used throughout the drawings to refer to the same or like parts.

Figures 1, 2:
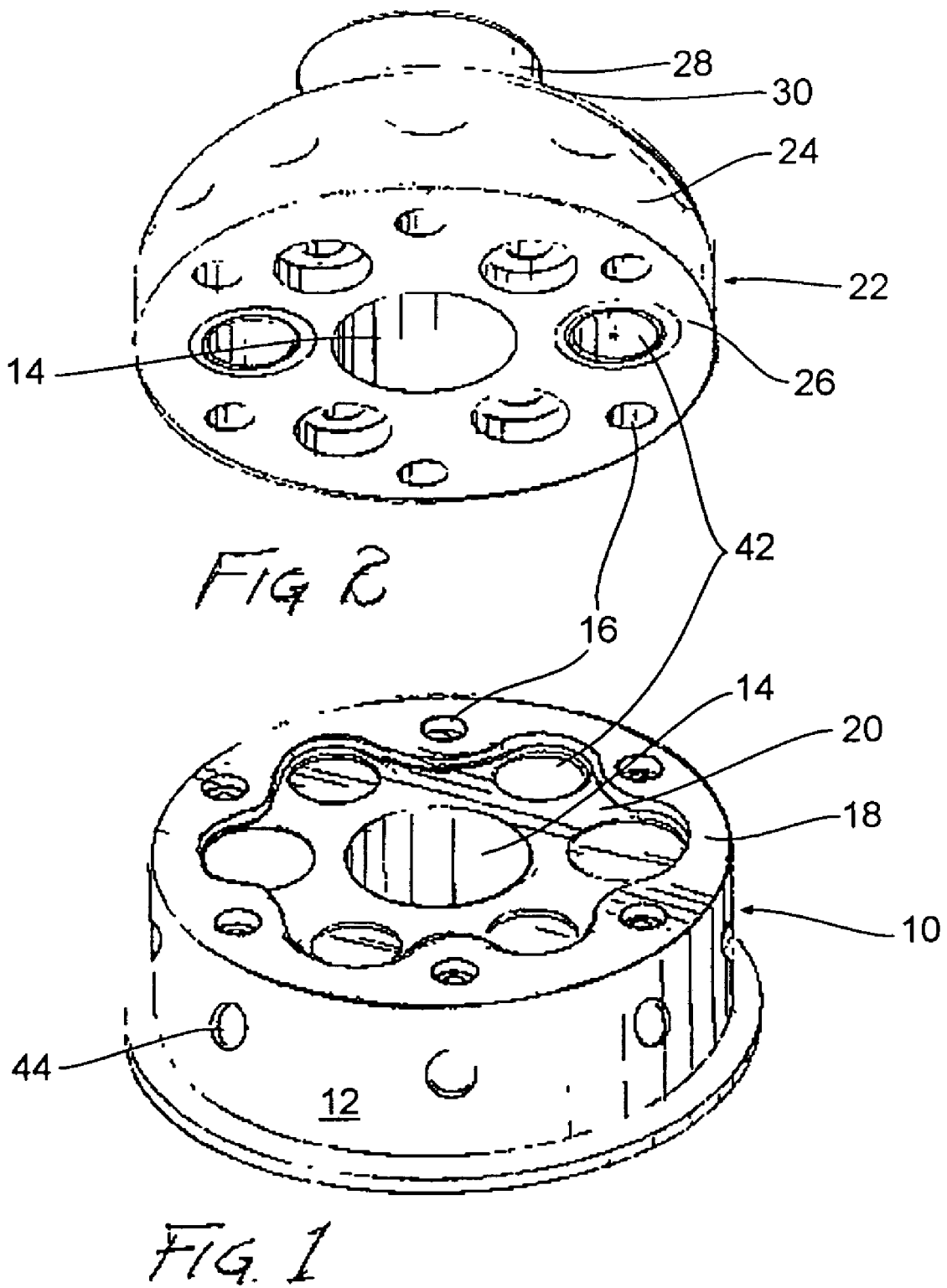
FIG. 1 is a perspective view of a first ablative composite sub-assembly that is to be joined to a second ablative composite sub-assembly according to this invention.
FIG. 2 is a perspective view of the second ablative composite sub-assembly to be joined to the first ablative composite sub-assembly of FIG. 1.

Referring to FIG. 1, a first ablative composite sub-assembly 10 comprises a first substantially cylindrical member 12 having an enlarged central opening 14 opening at an end 20 of the first cylindrical member 12 for hot gas flow. The first cylindrical member 12 further defines a multiplicity of openings 42 open at the end 20 of the first cylindrical member 12. The first cylindrical member 12 also defines a multiplicity of smaller openings 16 located on a surface of an elevated portion 18 of the end 20 of the first cylindrical member 12. Additionally, the first cylindrical member 12 defines a multiplicity of radial openings 44 located on portions of a surface of a vertical wall of the first cylindrical member 12.

According to FIG. 2, a second ablative composite assembly 22 comprises a second substantially cylindrical member 24 having an enlarged corresponding central opening 14 open at an end 26 of the second cylindrical member 24 for hot gas flow. The second cylindrical member 24 also defines a multiplicity of corresponding openings 16 and 42 open on portions of a surface of the end 26 of the second cylindrical member 24. The second cylindrical member 24 further comprises a substantially cylindrical protrusion 28 at an opposite end 30 of the second cylindrical member 24. The cylindrical protrusion 28 has an enlarged central opening (see FIG. 4), which is an extension of the enlarged central opening 14 for hot gas flow of the second cylindrical member 24.

FIG. 3 is a perspective view of a film adhesive 32 shaped like a gasket in position to be coupled to a portion of the surface of the elevated portion 18 of the first cylindrical member 12. The adhesive 32 is cut to conform to the shape of the elevated portion 18 and includes a multiplicity of openings corresponding to the openings 16 of the first cylindrical member 12. In practice, the film adhesive 32 is comprised of an adhesive defined by a pre-determined thickness, which is sandwiched between two outer disposable backings. FIG. 3 illustrates the combined first ablative composite sub-assembly 10 (see FIG. 1) and adhesive 32 prior to the steps of masking off a portion of the surface of the end 20 of the first cylindrical member 12 that is to be protected from joining; abrading a portion of the surface of the elevated portion 18 of the end 20 of the first cylindrical member 12 that is to be joined; cleaning the abraded surface with a volatile solvent such as methyl ethyl ketone (MEK); blow drying off the volatile solvent. After preparing the surfaces, brush SCOTCHWELD EE 2174 primer onto both bond surfaces. Allow to air dry for sixty (60) minutes, then cure in an oven at 265° F. for one hour. Cutting out the film adhesive 32 with a die corresponding to the shape of the elevated portion 18; removing a backing of the film adhesive 32; coupling an exposed surface of the adhesive surface of the partially backed film adhesive 32 to the elevated portion 18; tacking the partially backed film adhesive 32 to a portion of the elevated portion 18 with a heat gun; and removing a second backing of the film adhesive 32 with a spatula so that voids between the adhesive 32 and a portion of the surface of the elevated portion 18 are also eliminated.

Figure 4:
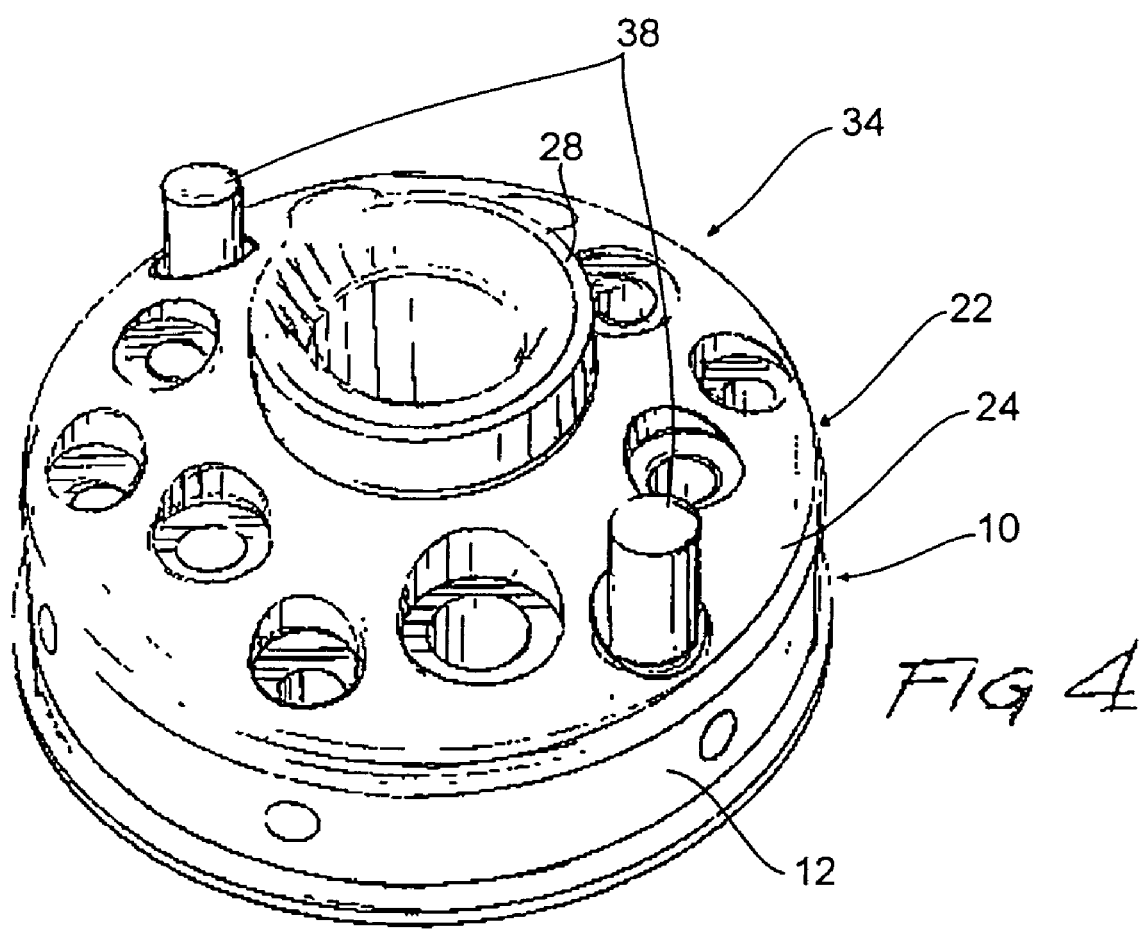
FIG. 4 is a perspective view of guide pins passing through openings of an uncured ablative composite assembly comprising the first and second composite sub-assemblies of FIGS. 3 and 2, respectively, in preparation for curing by heat in a ventilated oven.

FIG. 4 is a perspective view of an uncured ablative composite assembly 34 comprising the first ablative composite sub-assembly 10 coupled to a surface of the adhesive 32 (not shown in FIG. 4) and the second ablative composite sub-assembly 22 coupled to an opposite surface of the adhesive 32. Temporary guide pins 38 are used to align the adhesively coupled ablative composite sub-assemblies 10, 22 during curing of the adhesive 32. A portion of the surface of the end 26 (see FIG. 2) of the second cylindrical member 24 of the second ablative composite sub-assembly 22 that is to be joined is abraded, cleaned with a volatile solvent such as methyl ethyl ketone (MEK) and blow dried to remove the solvent prior to coupling the second ablative composite sub-assembly 22 to the opposite surface of the adhesive 32.

Figure 5:
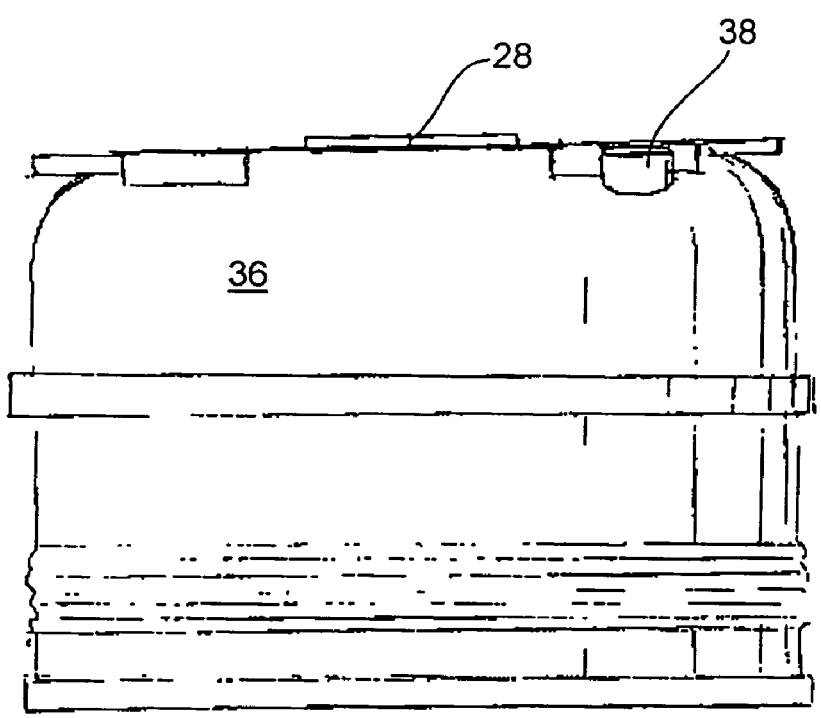
FIG. 5 is an elevation view of a housing enclosing the uncured ablative composite assembly of FIG. 4.

FIG. 5 is an elevation view of a housing 36 enclosing the uncured ablative composite assembly 34 (shown in FIG. 4). As shown in FIG. 5 a portion of the cylindrical protrusion 28 projects outside of the housing 36. The combined housing 36 and uncured ablative composite assembly 34 are loaded into a ventilated oven in preparation for curing of the adhesive 32.

Figure 6:
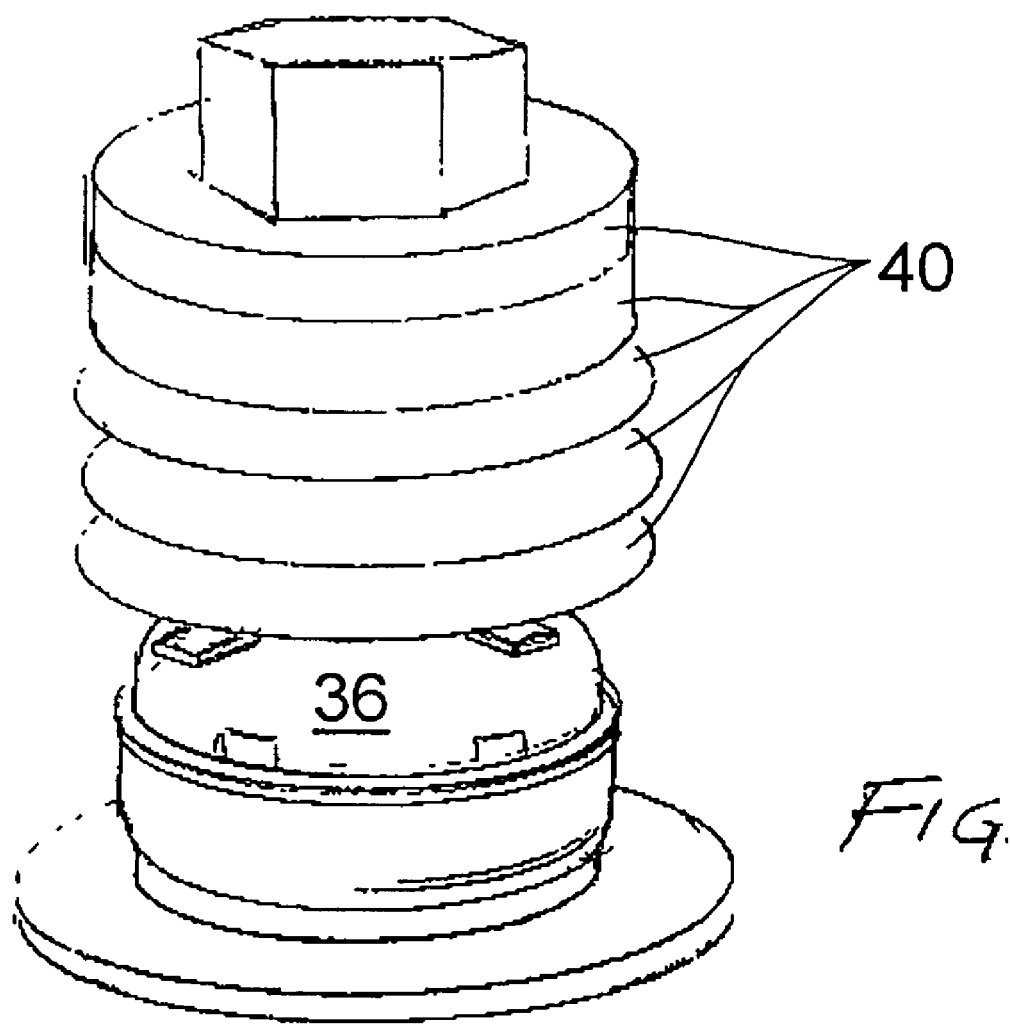
FIG. 6 is a perspective view of a stack of weights mounted on the combined housing and the uncured ablative composite assembly of FIG. 5, in preparation for curing by heat in a ventilated oven.

FIG. 6 is a perspective view of a multiplicity of weights 40 mounted on the housing 36 enclosing the uncured ablative composite assembly 34. The weights 40 provide an even load on the adhesive 32. The combined weights 40, housing 36 and uncured ablative composite assembly 34 are thermally cured in a ventilated oven producing a cured ablative composite assembly 34 enclosed by the housing 36.

FIG. 7 is an illustration of the appearance of the cured ablative composite assembly prior to hot surface gasses (5000° F.) passing through the central opening 14 of the cured ablative composite assembly 34. In FIG. 7, the adhesive 32 in the bond line located on a portion of each of a surface at the ends 20, 26 of each of the members 12, 24, respectively, is depicted as either a cured paste or cured film adhesive. FIG. 7A is an illustration of the appearance of the cured ablative composite assembly after hot surface gasses (5000° F.) pass through the central opening 14 of the cured ablative composite assembly 34, when a paste adhesive is used to join the respective ablative composite sub-assemblies 10 and 22. Referring to FIG. 7A a portion of each one of an inner surface of each one of the members 12, 24 defines a charred portion 46 of the members 12, 24. The cured paste adhesive in the bond line located at the ends 20, 26 of each of the members 12, 24, respectively, is depicted as a charred portion 48. The charred portion 48 of the cured paste adhesive extending from the inner surface of the members 12, 24 into a portion of the ends 20, 26 of the members 12, 24, respectively, is shown to be eroded by degradation.

In contrast FIG. 7B is an illustration of the appearance of the cured ablative composite assembly 34 after hot surface gasses (5000° F.) pass through the central ablative composite assembly 34 using a cured film adhesive to join the ablative composite sub-assemblies 10 and 22. Referring now to FIG. 7B a portion of each one of the inner surfaces of each one of the members 12, 24 defines a charred portion 46 of the members 12, 24. The cured film adhesive in the bond line located at the ends 20, 26 of each of the members 12, 24, respectively, is depicted as a charred portion 48. However, the cured film adhesive in the bond line located at the ends 20, 26 of each of the members 12, 24, respectively, is shown to be non-eroded (compare with FIG. 7A).

A number of different film adhesives were evaluated for effectiveness in joining ablative composite sub-assemblies as described above. The film adhesives included SCOTCH-WELD™ AF-31 (3M™ Corp); PLASTILOCK® 655-1 (SIA Adhesives, Inc. division of Sovereign Specialty Chemicals); FM® 24 (Cytec Industries, Inc.); Hysol® EA 9673 (Loctite Aerospace division of Loctite Corporation); Hysol® EA 9689 (Loctite Aerospace division of Loctite Corporation). SCOTCH-WELD™ AF-31 and PLASTILOCK® 655-1 are thermosetting unsupported nitrile phenolic structural film adhesives; FM® 24 and Hysol® EA 9689 are thermosetting modified epoxy structural film adhesives and Hysol® EA 9673 is a modified bismaleimide epoxy structural film adhesive.

SCOTCH-WELD™ AF-31 and PLASTILOCK® 655-1 are preferred film adhesives, and SCOTCH-WELD™ AF-31 is the most preferred film adhesive. The extrusion rate, bond integrity and handling characteristics of SCOTCH-WELD™ AF-31 are the basis of experimentally choosing the film adhesive for joining the ablative composite sub-assemblies 10 and 22. By way of example, Table 1 shows a summary of adhesive extrusion data when a substantially square sample of adhesive is sandwiched between two glass slides and cured under a load of about 11 pounds (5 Kilograms) for about 2 hours at substantially 300° F. (149° C.).

TABLE 1

SUMMARY OF ADHESIVE EXTRUSION DATA

| | BEFORE CURE | | AFTER CURE | |
| --- | --- | --- | --- | --- |
| SAMPLE | X, inches | Y, inches | X, inches | Y, inches |
| PLASTILOCK ® 655-1 | 0.494 | 0.514 | 0.660 | 0.710 |
| SCOTCH-WELD ™ AF-31 | 0.512 | 0.760 | 0.628 | 0.603 |

Test coupons simulating the ablative composite assembly 34 were loaded with a gas to compression test the integrity of the bond line. SCOTCH-WELD™ AF-31 was also the preferred film adhesive from the compression loading test.

Ablative composite assemblies 34 were also sectioned through the bond line and showed whether the film adhesive had eroded after exposure to hot gasses (5000° F.). SCOTCH-WELD™ AF-31 and PLASTILOCK® 655-1 showed no erosion by microscopic examination in comparison to the other film adhesives discussed above.

A preferred method for making an ablative composite assembly from pre-formed silica/phenolic composite sub-assemblies is as follows:

The unsupported film adhesive SCOTCH-WELD™ AF-31 comprising the adhesive portion defined by a pre-determined thickness of about 9-11 mils (0.2-0.3 mm), which is sandwiched between two outer disposable backings is cut out from the film adhesive SCOTCH-WELD™ AF-31 with a die corresponding to the shape of the elevated portion 18 of the first cylindrical member 12. A portion of a surface of the end 20 of the first cylindrical member 12 that is not to be joined is masked off. A portion of the surface of the elevated portion 18 of the end 20 of the first cylindrical member 12 that is to be joined is abraded with 120 grit emery paper providing an average surface roughness of about 58 micro inches (1.5× $10^{-3}$ mm). The abraded surface is cleaned with a volatile solvent such as methyl ethyl ketone (MEK). The volatile solvent is evaporated off by blow drying. A backing of the film adhesive SCOTCH-WELD™ AF-31 is removed. The adhesive surface of the partially backed film adhesive SCOTCH-WELD™ AF-31 is coupled to the abraded surface of the elevated portion 18. The partially backed film adhesive SCOTCH-WELD™ AF-31 is tacked to the abraded surface of the elevated portion 18. A second backing of the film adhesive SCOTCH-WELD™ AF-31 is removed with a spatula so that voids between the film adhesive SCOTCH-WELD™ AF-31 and the surface of the elevated portion 18 are also eliminated. A portion of the surface of the end 26 of the second cylindrical member 24 of the second ablative composite sub-assembly 22 that is to be joined is abraded, cleaned with a volatile solvent such as methyl ethyl ketone (MEK) and blow dried, evaporating off the solvent. A portion of a surface of the end 26 of the second ablative composite sub-assembly 22 is coupled to the opposite surface of the film adhesive SCOTCH-WELD™ AF-31. Guide pins 38 are inserted through the openings 16 of the first and second cylindrical members 12, 24 to insure proper alignment of the first and second ablative composite sub-assemblies 10, 22. A steel housing 36 is mounted over the uncured ablative composite assembly 34 substantially enclosing the uncured ablative composite assembly 34. The combination of the steel housing 36 and the uncured ablative composite assembly 34 is loaded into a ventilated oven in preparation for curing of the film adhesive SCOTCH-WELD™ AF-31. Preferred loads prior to curing result in a bond line stress of substantially 25 pounds per square inch (172 KPa). A preferred cure temperature is substantially 300° F. (149° C.) for a period of about 3 hours.

Alternatively, curing of the ablative assembly is accomplished with pressure applied in the kiln or oven. In this embodiment, the oven or kiln is equipped with fixturing such as a press. The press is configured such that it can exert a force upon the ablative structure. Use of a tooling such as a press internal to the oven or kiln provides a more stable load path through the components to be bonded. The combined use of the press fixturing with the previously-described guide pins allows the phenolic components to be loaded without the possibility of the load shifting, or the components shifting on the base plate. The new fixturing also concentrates the load on the bond joint, reducing the possibility of unsupported sections of the phenolic components flexing while under load.

In summary, a cured ablative composite assembly 34 comprises a housing 36 enclosing a pair of ablative composite sub-assemblies 10, 22 joined by a film adhesive 32. The cured ablative composite assembly 34 is made by surface treating both ablative composite sub-assemblies 10, 22 in preparation for joining; coupling one ablative composite sub-assembly 10 to another ablative composite sub-assembly 22 with a film adhesive 32 and enclosing the uncured ablative composite assembly 34 within a housing 36; and depositing the combination of the housing 36 and uncured composite ablative assembly 34 in a ventilated oven with a load applied to the combination housing 36 and uncured composite ablative composite assembly 34. The film adhesive 32 is cured providing a portion of a hot gas valve suitable for use in tactical missiles. The film adhesive 32 does not erode at the high temperatures (5000° F.) encountered in hot gas rocket exhausts, thereby providing a seal that offers high strength, pressure-tight joints.

While the invention has been particularly shown and described with reference to preferred embodiments thereof, it will be understood by those skilled in the art that the foregoing and other changes in form and details may be made therein without departing from the spirit and scope of the invention. For example, other nitrile phenolic film adhesives made by other adhesives manufacturers would also be suitable. Curing pressures, temperatures and times for curing may be varied. Methods for surface preparation may be altered, by using different abrasion methods and addition of coupling agents to the surfaces of the ablative composite sub-assemblies to enhance bonding strength. The method for making a cured ablation composite assembly may be automated. The housing may comprise metals other than steel and may further comprise a composite material or plastic.

What is claimed is:

1. An ablative rocket exhaust assembly for deployment on a rocket, the ablative rocket exhaust assembly comprising:
   a first ablative composite sub-assembly and a second ablative composite sub-assembly;
   a plurality of radial openings formed through an outer wall of said first ablative composite sub-assembly, each radial opening in said plurality of radial openings extending in radial direction substantially perpendicular to the longitudinal axis of the ablative rocket nozzle;
   a first plurality of axial openings in said first ablative composite sub-assembly;
   a second plurality of axial openings in said second ablative composite sub-assembly and generally aligning with said first plurality of axial openings; and
   a film adhesive disposed between said first ablative composite sub-assembly and said second ablative composite sub-assembly, said film adhesive including a third plurality of openings therethrough generally aligning with said first plurality of axial openings and said second plurality of axial openings, said film adhesive joining together said first ablative composite sub-assembly to said second ablative composite sub-assembly when said film adhesive is cured.

2. The ablative rocket exhaust assembly according to claim 1 wherein a portion of a surface of said film adhesive is coupled to an end portion of said first ablative composite sub-assembly and a portion of an opposite surface of said film adhesive is coupled to an end portion of said second ablative composite sub-assembly.

3. The ablative rocket exhaust assembly according to claim 1 further comprising a housing enclosing said first and second ablative composite sub-assembly.

4. The ablative rocket exhaust assembly according to claim 1 wherein said first ablative composite sub-assembly includes a first substantially cylindrical member, wherein said first substantially cylindrical member has an elevated end portion, and wherein a portion of a surface of said film adhesive is coupled to a portion of a surface of said elevated end portion of said first cylindrical member.

5. The ablative rocket exhaust assembly according to claim 1 wherein said second ablative composite sub-assembly includes a second substantially cylindrical member;
   wherein a portion of a surface of an end portion of said second cylindrical member is coupled to an opposite surface of said film adhesive; and
   wherein a substantially cylindrical protrusion is located at an opposite end of said second cylindrical member.

6. The ablative rocket exhaust assembly according to claim 1 wherein said film adhesive is a sealant.

7. The ablative rocket exhaust assembly according to claim 1 wherein said film adhesive comprises a thermosetting film adhesive.

8. The ablative rocket exhaust assembly according to claim 1 wherein said film adhesive comprises a nitrile phenolic film adhesive.

9. The ablative rocket exhaust assembly according to claim 8 wherein the thickness of said film adhesive is about 9-11 mils (0.2-0.3 mm).

10. The ablative rocket exhaust assembly according to claim 8 wherein said film adhesive is cured at a temperature of substantially 300° F. (149° C.) for at least about 2 hours with a bond line pressure of substantially 25 pounds per square inch (172 KPa).

11. The ablative rocket exhaust assembly according to claim 10 wherein said film adhesive is cured at a temperature of substantially 300° F. (149° C.) for about 3 hours with a bond line pressure of substantially 25 pounds per square inch (172 KPa).

12. The ablative rocket exhaust assembly according to claim 1 wherein the ablative composite assembly is made of at least silica phenolic.

13. An ablative rocket exhaust assembly for deployment on a rocket, the ablative rocket exhaust assembly comprising:
   a first ablative composite sub-assembly and a second ablative composite sub-assembly;
   a housing substantially enclosing said first and second ablative composite sub-assembly;
   a film adhesive disposed between said first ablative composite sub-assembly and said second ablative composite sub-assembly, said film adhesive joining together said first ablative composite sub-assembly to said second ablative composite sub-assembly to provide an ablative composite gas valve when said film adhesive is cured;
   a first plurality of openings in said first ablative composite sub-assembly; and
   a second plurality of openings in said second ablative composite sub-assembly and generally aligning with said first plurality of openings when said first ablative composite sub-assembly is adhesively joined to said second ablative composite sub-assembly by said film adhesive;
   wherein said film adhesive includes a third plurality of openings therethrough that generally aligns with said first plurality of openings in said first ablative composite sub-assembly and with said second plurality of openings in said second ablative composite sub-assembly.

14. The ablative rocket exhaust assembly of claim 13 wherein a portion of a surface of said film adhesive is coupled to an end portion of said first ablative composite sub-assembly and a portion of an opposite surface of said film adhesive is coupled to an end portion of said second ablative composite sub-assembly.

15. The ablative rocket exhaust assembly of claim 13 wherein said first ablative composite sub-assembly includes a first substantially cylindrical member;
   wherein said first cylindrical member has an enlarged opening for hot gas flow through said first cylindrical member and a plurality of openings through said first cylindrical member;
   wherein said first substantially cylindrical member has an elevated end portion and a portion of a surface of said elevated end portion has a multiplicity of openings; and
   wherein a portion of a surface of said film adhesive is coupled to a portion of a surface of said elevated end portion of said first cylindrical member.

16. The ablative rocket exhaust assembly of claim 15 wherein said first cylindrical member further includes a vertical wall, a portion of a surface of said wall having a multiplicity of radial openings.

17. The ablative rocket exhaust assembly of claim 13 wherein said second ablative composite sub-assembly further comprises a substantially cylindrical protrusion at an opposite end of said second cylindrical member, said cylindrical protrusion having an enlarged opening for hot gas flow through said second cylindrical member.

18. The ablative rocket exhaust assembly of claim 1 further comprising a guide pin extending from one of the first plurality of axial openings, through one of the third plurality of axial openings, and into one of the second plurality of openings to align the first ablative composite sub-assembly with the second ablative composite sub-assembly.

19. The ablative rocket exhaust assembly of claim 18 wherein the guide pin contacts the first ablative sub-assembly proximate a first axial opening in the first plurality of axial openings.

20. The ablative rocket exhaust assembly of claim 19 wherein an outer diameter of the guide pin is substantially equivalent of the inner diameter of the first axial opening.

* * * * *

UNITED STATES PATENT AND TRADEMARK OFFICE
CERTIFICATE OF CORRECTION

PATENT NO. : 7,578,452 B2 Page 1 of 1
APPLICATION NO. : 10/650166
DATED : August 25, 2009
INVENTOR(S) : Gratton et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1763 days.

Signed and Sealed this

Seventh Day of September, 2010

David J. Kappos
*Director of the United States Patent and Trademark Office*